US006791292B2

(12) United States Patent
Weiss et al.

(10) Patent No.: US 6,791,292 B2
(45) Date of Patent: Sep. 14, 2004

(54) METHOD FOR CONTROLLING THE MOVEMENT OF A ROBOT

(75) Inventors: Martin Weiss, Margertshausen (DE); Thomas Finsterwalder, Augsburg (DE); Günther Merk, Altenmünster (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 10/154,519

(22) Filed: May 23, 2002

(65) Prior Publication Data

US 2003/0020424 A1 Jan. 30, 2003

(30) Foreign Application Priority Data

May 25, 2001 (DE) .......................................... 101 25 445

(51) Int. Cl.[7] .............................................. G06F 19/00
(52) U.S. Cl. ...................... 318/568.11; 318/565; 901/2; 901/49; 700/250; 700/255
(58) Field of Search ................................ 318/566, 567, 318/568.12, 568.15, 626, 568.11, 568.21, 565; 901/8, 13, 49, 2, 11, 12, 41; 700/245, 255, 250

(56) References Cited

U.S. PATENT DOCUMENTS

| | | | | |
|---|---|---|---|---|
| 3,935,950 A | * | 2/1976 | Burch ........................ 318/568 |
| 4,603,284 A | * | 7/1986 | Perzley ...................... 318/568 |
| 5,159,249 A | * | 10/1992 | Megherbi ................. 318/568.1 |
| 5,331,542 A | * | 7/1994 | Itoh ............................. 901/20 |
| 5,908,122 A | * | 6/1999 | Robinett et al. .............. 901/17 |
| 6,218,801 B1 | * | 4/2001 | Brog.ang.rdh et al. ...... 318/567 |
| 6,541,932 B2 | * | 4/2003 | Gerum .................. 318/568.12 |

FOREIGN PATENT DOCUMENTS

| | | |
|---|---|---|
| AT | 401 746 | 11/1996 |
| DE | 195 17 771 | 11/1996 |
| DE | 198 00 552 | 1/1999 |
| DE | 199 07 989 | 10/1999 |

OTHER PUBLICATIONS

T. Horsch, H. Nolzen und P. Adolphs, Sep. 1991, Schnelle kollisionsvermeidende Bahnplanung für einen Roboter mit 6 rotatorischen Freiheitsgraden, Robotersysteme 7, 185–192 (1991), No.

* cited by examiner

Primary Examiner—Rina Duda
Assistant Examiner—Eduardo Colon Santana
(74) Attorney, Agent, or Firm—McGlew and Tuttle, P.C.

(57) ABSTRACT

Accompanied by the optimization of the possibilities of use of a robot, particularly with regards to low cycle times and high loads, damage to the robot through exceeding the energy absorbable by the structure is still prevented when robot parts strike against the mechanical structure as a result of faults or errors, according to the invention in a method for controlling the movement of a robot, the kinetic energy of moving robot members ($G_i$ $g_{i+1}$, ..., $g_n$) about an axis ($A_i$) is limited to the energy absorbable in damage-free manner by a mechanical buffer associated with the corresponding axis ($A_i$).

6 Claims, 5 Drawing Sheets

Calculation of the linear and rotary velocity $v_j, \omega_j$ of the mass centre of each member i in the particular coordinate system $i = 1, \ldots, n$ For all axes $i = 1, \ldots, n$:

Energy with a crash $A_i$ at present position due to movement of member i:
Set $E_i = (1/2) \, m_i \, v_i^2$ for linear axes
$E_i = (1/2) \, J_i \, \omega_i^2$ for rotation axes
($m_i$ = mass member i, $J_i$ = mass moment of inertia member i about $A_i$)

For all axes $j = 1, \ldots i - 1, i + 1, \ldots, n$:

Calculate $v_j, \omega_j$ in coordinates $i$ : $v_j, \omega_j$

Determine from $v_j, \omega_j$ the velocity component $v, \omega$, which can only be explained by the movement of $A_i$, but not the movement of the axes between i and j (reduction algorithm, of figs. 1 - 3)

Set speed after crash:
$v_j^+ = v_j^- - v$
$\omega_j^+ = \omega_j^- - \omega$

Set
$\Delta = (1/2) \, m_j \, ((v_j^-)^2 - (v_j^+)^2)$ (linear axis)
$\Delta = (1/2) \, {}^iJ_j \, ((\omega_j^-)^2 - (\omega_j^+)^2)$ ((rotation axis, ${}^iJ_j$ mass moment of inertia member j about $A_i$)

Set
$E_i = E_i + \Delta$
if $\Delta > 0$

Crash energy about axis $A_i$ : $E_i$

Fig. 6

METHOD FOR CONTROLLING THE MOVEMENT OF A ROBOT

FIELD OF THE INVENTION

The invention relates to a method for controlling the movement of a robot.

BACKGROUND OF THE INVENTION

When using robots, particularly industrial robots, there must be an adequate degree of security and safety also in the case of errors, particularly faulty operations. Thus, there is a risk of an operator incorrectly adjusting an axis or programming inadmissible values for the software limit switch outside the operating range of mechanically provided stops or buffers. In both cases a risk arises that on performing a sequence incorrectly programmed in this way, an axis is moved out of the mechanically permitted range, because the coincidence assumed by the control software of the control-internal position with the mechanical position no longer exists. To provide security against such errors and faulty operations, mechanical structures, such as in the form of buffer stops, are fitted to the robot, if the movement of a robot part is to be limited with respect to the parts positioned upstream thereof. Thus, on the robot base can be provided corresponding mechanical buffers for the carrousel movement or on the upper end of the rocker arm mechanical buffers for the further robot arm articulated to said end.

In the case of such errors the robot is subject to a collision or crash, i.e. the colliding member of the robot mechanism moves against a mechanical buffer associated with it and its axis and during the crash the buffer is irreversibly deformed. During this process the buffer may be destroyed and must always be replaced following the crash. During this deformation kinetic energy of the robot is converted into internal energy (heat) and resilience of the robot. It is important to protect the robot, so that the control software triggers a stop reaction. Thus, even with such a serious and exceptional situation, the robot is brought to a stop without damaging its mechanism. Without mechanical damage to the robot elements, the mechanical buffers can only absorb a limited energy. It is necessary to reliably prevent any exceeding of the maximum energy absorbable without damage to the robot elements. Thus, precautions are taken so that in the case of all movements in the error situations described a collision does not lead to damage. Hitherto a combination of maximum load, maximum overhang and maximum speed for the movement about an axis has been used as a basis. These maximum values are determined by the robot manufacturer, so that with the corresponding worst case values tests are carried out to establish up to which parameters it is possible to repeatedly move against the mechanical buffers without damage occurring. It is then assumed that if a malfunction occurs with the user the energy absorption capacity of the buffer is not exceeded and that all the parameters relevant in a crash do not simultaneously reach their maximum. As a result the predetermined maximum axle speed is linked with the maximum load. Even if as a result of its mechanical design the robot could reach higher speeds, this must be rejected by the control software, because damage to the structure cannot be excluded. As a result of the maximum axle speed determined for maximum load and overhang, movements with a small load and small overhang are performed unnecessarily slowly.

Therefore the problem of the invention, whilst avoiding the aforementioned disadvantages, is to provide a method for the control of a robot in which, accompanied by the optimization of the robot operating parameters, particularly low cycle times and the possibility of moving large loads, a destruction of the robot is reliably prevented.

SUMMARY OF THE INVENTION

In a method of the aforementioned type, the invention solves the set problem in that kinetic energy of moving robot members ($g_i, \ldots, g_{i-1}, g_i, g_{i+1}, \ldots, g_n$) about an axis ($A_i$) is limited to the limiting energy absorbable in damage-free manner by a mechanical structure associated with the corresponding axis ($A_i$).

Thus, the invention comprises the planning of a path movement, accompanied by a speed reduction on the path, so that the physical kinetic energy which, on the collision of an axis or axle with mechanical stops is converted into internal energy, does not exceed a predetermined value.

Thus, according to the invention, the axle speeds are limited under the secondary condition that the energy limits, determined by the loadability of the mechanical structure, speed, load and overhang are respected. The term limiting energy absorbable in damage-free manner means the limiting energy determined by the manufacturer and in particular by tests to the effect that it reliably prevents damage to any robot elements.

According to a preferred development of the invention, the kinetic energy of the robot members ($g_i, \ldots, g_{i-1}, \ldots, g_n$) of each axis ($A_i$) to be absorbed by a mechanical structure associated with a corresponding axis ($A_i$) is limited to the limiting energy absorbable in damage-free manner by the mechanical structure. The energy to be absorbed is that which actually acts on the structure. According to a preferred further development, the kinetic energy is limited as a function of the moving masses and/or the inertia tensor.

This is based on the fact that it has been established that in the case of a crash the entire kinetic energy of the robot does not have to be absorbed, because only the kinetic energy of the impact component on the buffer has to be absorbed by the latter and the member comes to a stop within a short collision time, whereas the remaining robot members can continue to move. Thus, in the case of a collision of the rocker arm, due to its movement about the A2 axis, the robot arm continues to move about its A3 axis. Moreover, during the collision of the carrousel during a movement about the A1 axis, the robot hand continues to move about the A6 axis, if the A1 and A6 axes are on a straight line. The structural unit affected by a collision must consequently only absorb part of the total kinetic energy present in the overall robot system. The energy of a robot member is dependent on the speeds or velocities solely of the joints in the kinematic chain up to and including said member. Thus, the total energy only has to be limited to the extent that the energy to be absorbed by the mechanical structure is effectively absorbed in non-destructive manner by it, i.e. the energy absorption capacity is not exceeded. Thus, on the energy absorbable by the mechanical structure only part of the total kinetic energy has to be limited and can consequently be chosen higher than if it was limited to the value which can be non-destructively absorbed by the structure. Thus, the dynamic limits of the robot can be extended.

Thus, according to the invention, there is a functional, situation-dependent monitoring and planning of the kinetic energy of the robot and optionally boundaries. The axle speed is reduced in state-dependent manner, in that before performing a movement instruction mathematically and whilst taking account of the robot position and the useful or working load, the kinetic energy is determined as a function of the programmed axle speed. Optionally, on exceeding the maximum permitted energy, the maximum speed of the particular axle is correspondingly reduced.

This leads to a use advantage for robot variants as a result of higher working load, arm extension or the like, because the limiting of the maximum axle speeds only takes place in states where in actual fact excessive kinetic energy would arise.

BRIEF DESCRIPTION OF THE DRAWINGS

Further features can be gathered from the description in which, in a simplified representation, all the collision situations relevant for the algorithm with rotating axles are represented in exemplified manner. In the drawings show:

FIG. 6 A sequence diagram of a preferred development of the inventive method.

DETAILED DESCRIPTION OF THE DRAWINGS

Figure 1:
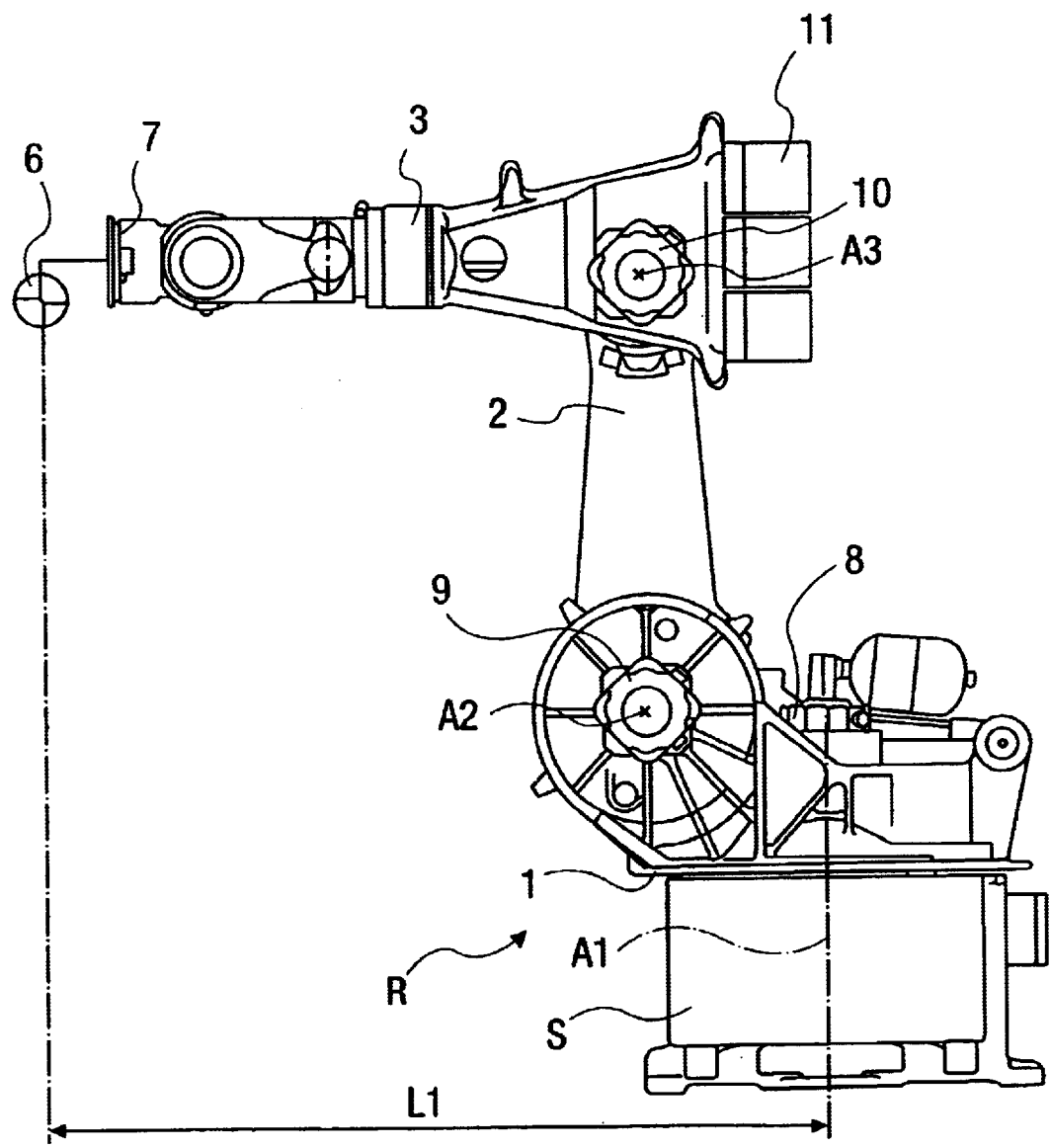
FIG. 1 A side view of a robot with a vertically directed rocker arm and therefore limited overhang.

FIG. 1 shows a robot R with a stationary base S, a first robot member 1 in the form of a carrousel located thereon and which is rotatable about the vertical A1 axis of the robot R, with a robot member 2 pivotable about the horizontal A2 axis, as well as a further robot member 3, the robot arm, freely pivotable at the end of rocker arm 2 about the A3 axis. At its free end is located a robot hand 7, which carries a workpiece 6. A motor 8 serves to rotate the rocker arm 1 about the A1 axis. A motor 9 rotates the rocker arm 2 about the A2 axis. The motor 10 indicates the movement for arm 3 and motor 11 the movement of hand 7. In FIG. 1 the robot has a relatively small overhang L1 between the A1 axis and workpiece 6, the rocker arm being in the vertical position.

Figure 2:
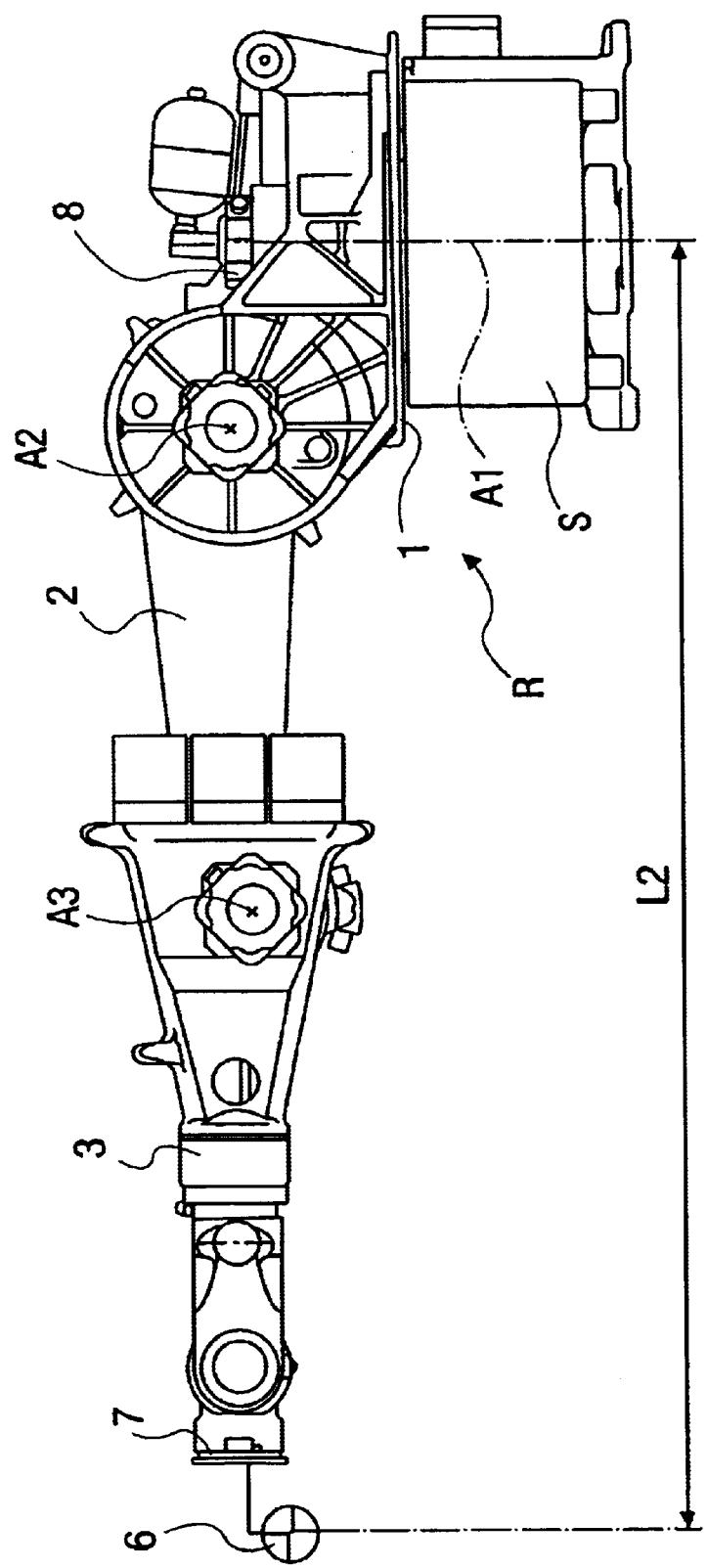
FIG. 2 A side view of a robot with maximum overhang with both a horizontally directed rocker arm and a horizontally directed arm.

FIG. 2 shows the same robot with a maximum overhang L2, which is brought about in that both the rocker arm 2 and the robot arm 3 are directed in parallel in the same direction and horizontally.

In the case of a collision of the carrousel of a robot R with mechanical structural means associated therewith, such as not shown buffers or stops, during a movement of the member 1, the carrousel, about its A1 axis, only the rotational energy of the mass moment of inertia of member 2, the rocker arm and higher members, about the A1 axis and in the form $$\frac{1}{2} J2 \cdot A2\phi 1^2$$

enters the energy to be absorbed by the buffer, but not the energy component in the rotation of the mass moment of inertia of member 2 about axis A2 with $$\frac{1}{2} J2 \cdot A2\phi 2^2$$

(FIG. 3).

Figure 4:
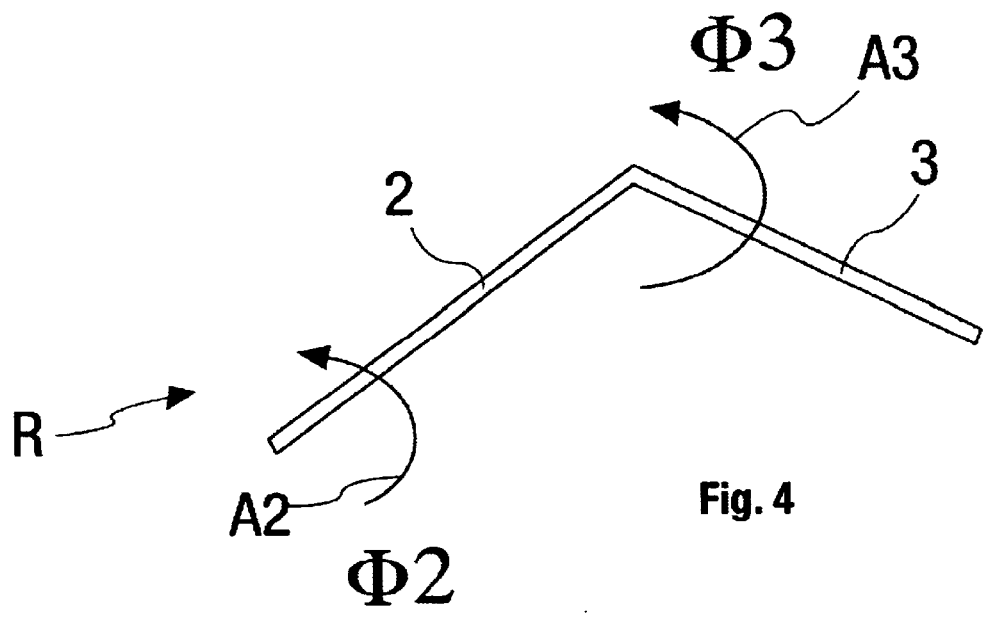
FIG. 4 A diagrammatic representation of the collision situation in the case of a robot rocker arm collision during its movement about the A2 axis.

In a collision of the movement of member 2 (rocker arm 2) about its A2 axis, it was experimentally observed that the A3 axis or member 3—robot arm—continued to move during the collision, even if a movement of the member 3 with $v_3=0$ was programmed (FIG. 4). Part of the kinetic energy of member 3, as a result of its joint movements about the A2 axis, was transformed during a collision into rotary movement energy about the A3 axis prior to the stopping of the robot. This kinetic energy of member 3 about the A3 axis consequently does not have to be absorbed by the mechanical structure. The proportion of energy converted into movement of the A3 axis is essentially dependent on the efficiency of the gear and the friction in the drive line. Corresponding parameters are established by the manufacturer, particularly through testing.

Figure 5:
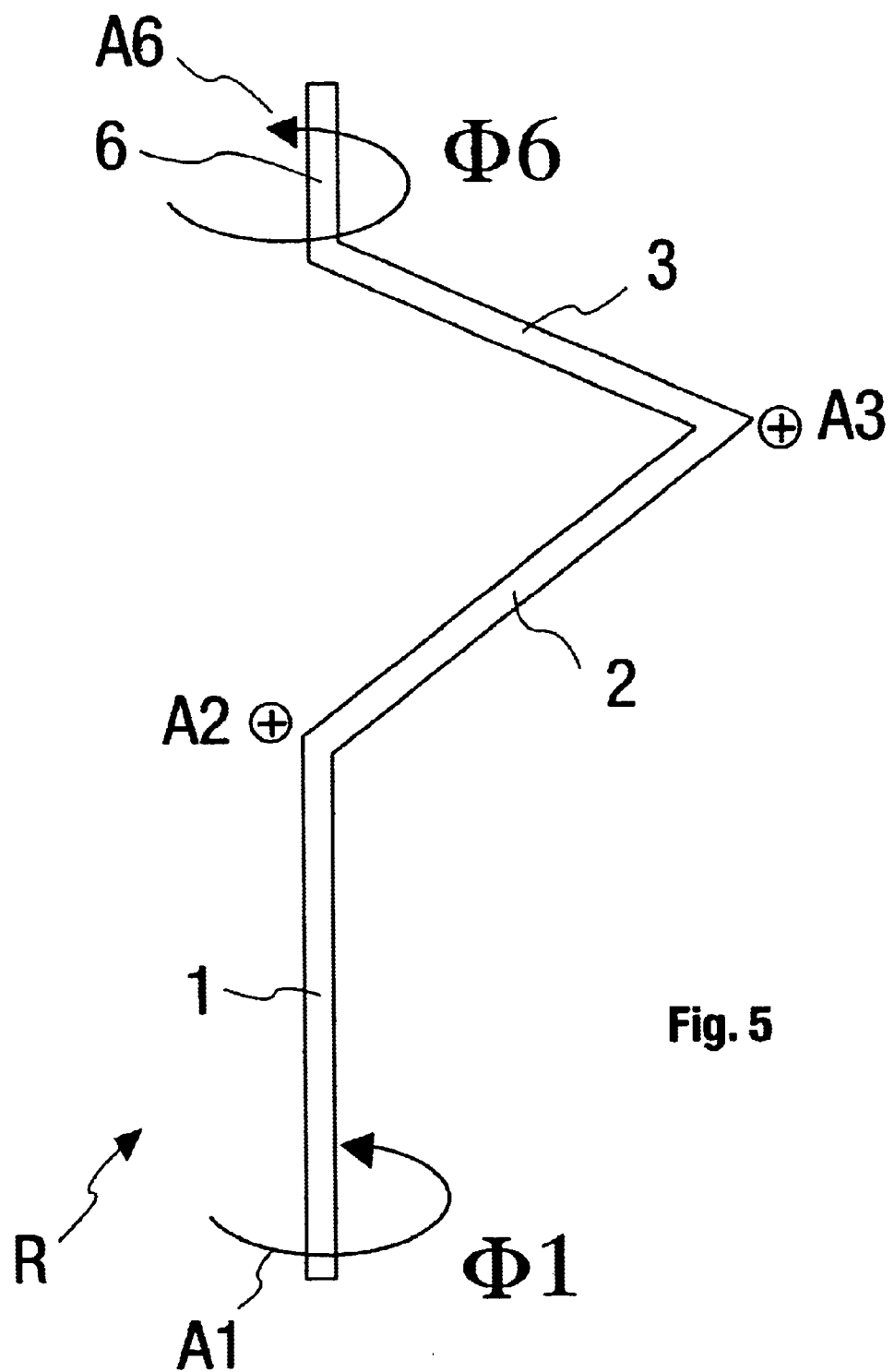
FIG. 5 A specific situation of the association of the A6 axis with the A1 axis of the robot with a carrousel collision during its movement about the A1 axis, the A6 axis being on a line with the A1 axis.

FIG. 5 diagrammatically shows the members of a robot in a specific position, namely that in which the A1 axis and the hand axis A6 are on a straight line. In a collision of member 1, i.e. the carrousel of the robot with the movement about the A1 axis, as a function of the friction in the drive line, efficiency of the gear, etc., the energy part in the movement of the workpiece 6 during rotation about the A6 axis is maintained and consequently also does not have to be absorbed by the mechanical structure associated with the A1 axis.

FIG. 4 is a diagram of the specific sequence of the inventive method. Firstly the linear and rotational speed or velocity $V_i$, $\omega_i$ for i=1, . . . , n of the concentrated mass of each member i in the particular coordinate system is determined. Then, for all the axes i−1 . . . , n, firstly the energy is determined for a collision or crash $A_i$ at a present position due to the movement of the member i giving $E_i=(\frac{1}{2})m_i v_i^2$ for linear axes, $E_i=(\frac{1}{2})J_i\omega_i$ for rotary axes, in which $m_i$ is the mass of the member i and $J_i$ the mass moment of inertia of member i about A1.

Figure 3:
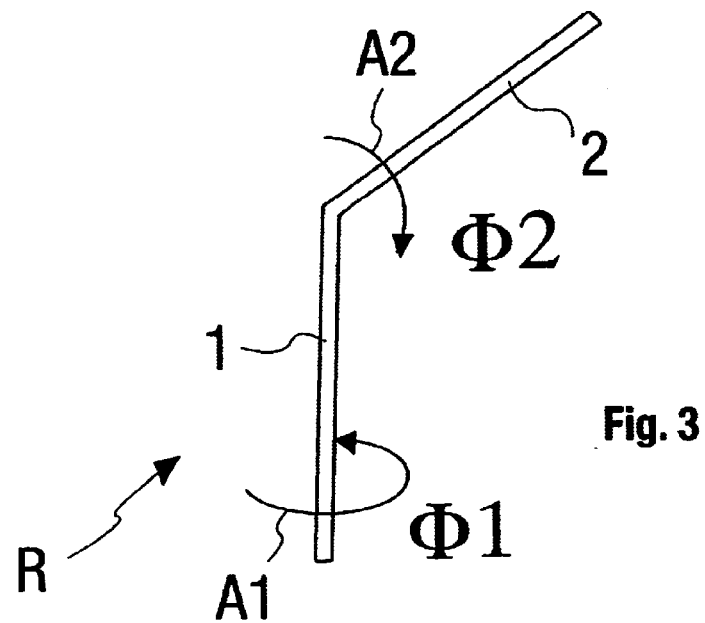
FIG. 3 A diagrammatic representation of the situation in a collision in the case of a movement of the carrousel of the robot about the A1 axis.

This is followed for crash $A_i$, i.e. of member i, for all the further axes j=1, . . . , i−1, i+1, . . . , n a calculation takes place of the linear and rotational velocity $V_j$, $\omega_j$ in coordinates of the member i with $V_j^-$ or $\omega_j^-$. From $V_j$, $\omega_j$, which can only be explained by the movement of $A_i$, not the movement of members between i and j (j as defined hereinbefore) is determined, as explained on the basis of specific examples in connection with FIGS. 1 to 3.

The velocity after the crash is set as $$V_j^+ = V_j^- - V$$

and the angular velocity $$\omega_j^+ \approx \omega_j^- - \omega$$

and for the R-axes $$\delta_L = (\frac{1}{2})m_j((V_j^-)^2-(V_j^+)^2)$$

as well as for the rotation axis $^iJ_j$ as the mass moment of inertia of member J about axis $A_i$ $$\delta(\frac{1}{2})^i J_j((\omega_j^-)^2-(\omega_j^+)^2).$$

The crash energy $E_i$ about axis $A_i$ is set at $$E_i = E_i + \Delta \text{ if } \Delta > 0$$

Thus, only a proportion of the linear and angular velocity and therefore energy, a movement about the axis, with respect to which account must be taken of a crash concerning the energy absorption by the mechanical structure, because only this proportion is involved, so that the total given energy can be reduced to said relevant energy. This applies for linear axes and rotary axes.

What is claimed is:

1. A method for controlling the movement of a robot, the method comprising the steps of:

providing a mechanical structure associated with the axis for which the robot movement is controlled;

during normal operation limiting kinetic energy of moving robot members about an axis to the limiting energy absorbable in damage-free manner by the mechanical structure associated with the corresponding axis, with said limiting energy being determined such that damage to robot elements is prevented in the case of collision.

2. A method according to claim 1, wherein the kinetic energy of the robot members of each axes to be absorbed by a mechanical structure associated with a corresponding axis is limited to the limiting energy absorbable in damage-free manner by the mechanical buffer.

3. A method according to claim 1, wherein the kinetic energy is limited as a function of the moving masses and/or the inertia tensor.

4. A method for controlling the movement of a robot, the method comprising the steps of:

providing a mechanical movement limiting buffer associated with the member and axis for which the robot movement is controlled and disposing the buffer for limiting the movement of the member for which the robot movement is controlled;

determining an energy amount whereby no damage to robot elements occurs in a case of collision between the member for which the robot movement is controlled and the mechanical buffer, based on the energy absorbable in damage-free manner by the buffer; and actively and continuously limiting the kinetic energy of the moving robot member with connected robot elements to said determined energy mount.

5. A method according to claim 4, wherein the kinetic energy is limited as a function of the moving masses and/or the inertia tensor.

6. A method for controlling the movement of a robot, the method comprising the steps of:

providing a mechanical movement limiting buffer associated with the member and axis for which the robot movement is controlled and disposed for limiting the movement of the member for which the robot movement is controlled;

actively and continuously limiting the kinetic energy as a function of the moving masses and/or the inertia tensor of the moving robot member to an energy amount that is absorbable in a damage-free manner by the mechanical buffer; and determining said energy amount to be such that damage to robot elements is prevented in the case of collision based on energy absorbable in damage-free manner by the mechanical buffer.

* * * * *